United States Patent
Tamaki et al.

(10) Patent No.: US 10,697,648 B2
(45) Date of Patent: Jun. 30, 2020

(54) HEATING AND HOT WATER SUPPLY SYSTEM

(71) Applicant: Mitsubishi Electric Corporation, Tokyo (JP)

(72) Inventors: Shogo Tamaki, Tokyo (JP); Hirokazu Minamisako, Tokyo (JP); Kazutaka Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 279 days.

(21) Appl. No.: 15/302,259

(22) PCT Filed: Jun. 30, 2014

(86) PCT No.: PCT/JP2014/067412
§ 371 (c)(1),
(2) Date: Oct. 6, 2016

(87) PCT Pub. No.: WO2016/001980
PCT Pub. Date: Jan. 7, 2016

(65) Prior Publication Data
US 2017/0023263 A1    Jan. 26, 2017

(51) Int. Cl.
*F24D 3/08*  (2006.01)
*F28D 20/00*  (2006.01)
(Continued)

(52) U.S. Cl.
CPC ............. *F24D 3/08* (2013.01); *F24D 3/18* (2013.01); *F24D 17/02* (2013.01);
(Continued)

(58) Field of Classification Search
CPC .......... F24D 3/08; F24D 3/18; F24D 19/1072; F24D 17/02; F24D 19/1069;
(Continued)

(56) References Cited

U.S. PATENT DOCUMENTS 4,409,958 A * 10/1983 Fillios ................. F24D 19/1051
                                                            122/14.1
4,598,694 A *  7/1986 Cromer ............... F24D 17/0021
                                                            122/19.1
(Continued)

FOREIGN PATENT DOCUMENTS

CN        102084190 A     6/2011
EP        2 620 711 A2    7/2013
(Continued)

OTHER PUBLICATIONS

International Search Report of the International Searching Authority dated Sep. 30, 2014 for the corresponding International application No. PCT/JP2014/067412 (and English translation).

(Continued)

*Primary Examiner* — Steven B McAllister
*Assistant Examiner* — John E Bargero
(74) *Attorney, Agent, or Firm* — Posz Law Group, PLC

(57) ABSTRACT

A hot water supply system that can reduce energy consumption is provided. The hot water supply system includes a liquid heater for heating a liquid, a liquid-water heat exchanger, a water-heating circuit in which the liquid is circulated between the liquid heater and the liquid-water heat exchanger, a lower outward path for leading water from a lower part of a hot water storage tank to the liquid-water heat exchanger, the upper return path for leading the water from the liquid-water heat exchanger to an upper part of the hot water storage tank, a middle outward path for leading the water from a middle part of the hot water storage tank to the liquid-water heat exchanger, a middle return path for leading the water from the liquid-water heat exchanger to a middle part of the hot water storage tank.

13 Claims, 9 Drawing Sheets

(51) Int. Cl.
*F28F 27/00* (2006.01)
*F24D 19/10* (2006.01)
*F24D 17/02* (2006.01)
*F24D 3/18* (2006.01)

(52) U.S. Cl.
CPC ..... *F24D 19/1069* (2013.01); *F24D 19/1072* (2013.01); *F28D 20/0039* (2013.01); *F28F 27/00* (2013.01); *F24D 2200/12* (2013.01); *F24D 2220/04* (2013.01); *F24D 2220/08* (2013.01); *F24D 2240/26* (2013.01); *Y02E 60/142* (2013.01)

(58) Field of Classification Search
CPC ............. F24D 2240/26; F24D 2200/12; F24D 2220/04; F24D 2220/08; F28F 27/00; F28D 20/0039; Y02E 60/142
USPC .......................................................... 237/8 A
See application file for complete search history.

(56) References Cited

U.S. PATENT DOCUMENTS

| | | | | |
|---|---|---|---|---|
| 7,883,024 B2* | 2/2011 | Nakayama | ......... | F24D 19/1039 237/19 |
| 9,453,667 B2* | 9/2016 | Nian | ...................... | F25B 41/04 |
| 9,879,867 B2* | 1/2018 | Sugimura | ................. | F24D 3/10 |
| 2011/0139259 A1* | 6/2011 | Nagata | .................... | F24D 3/082 137/1 |
| 2011/0305444 A1* | 12/2011 | Pussell | ............... | F24D 17/0031 392/308 |
| 2014/0291411 A1* | 10/2014 | Tamaki | .................... | F24D 3/18 237/2 B |
| 2015/0027143 A1* | 1/2015 | Nemesh | ............ | B60H 1/00007 62/79 |
| 2017/0023263 A1* | 1/2017 | Tamaki | .................... | F24D 3/08 |
| 2018/0023818 A1* | 1/2018 | Takayama | ................ | F24H 1/00 62/238.6 |

FOREIGN PATENT DOCUMENTS

| | | |
|---|---|---|
| JP | 2005-140439 A | 6/2005 |
| JP | 2006-336991 A | 12/2006 |
| JP | 41-02781 B2 | 3/2008 |
| JP | 2009-092304 A | 4/2009 |
| JP | 2010-175209 A | 8/2010 |
| JP | 2011-027298 A | 2/2011 |
| JP | 2011-141076 A | 7/2011 |
| JP | 2012-017893 A | 1/2012 |
| JP | 2012-117768 A | 6/2012 |
| JP | 2013-155911 A | 8/2013 |
| WO | 2013/084301 A1 | 6/2013 |

OTHER PUBLICATIONS

International Preliminary Report on Patentability dated Jan. 12, 2017 for the corresponding international application No. PCT/JP2014/067412 (English translation only).

Office Action dated Jun. 6, 2018 issued in corresponding EP patent application No. 14896872.0.

Office action dated Nov. 5, 2018 issued in corresponding CN patent application No. 201480079402.3 (and English machine translation thereof).

* cited by examiner

HEATING AND HOT WATER SUPPLY SYSTEM

CROSS REFERENCE TO RELATED APPLICATION

This application is a U.S. national stage application of International Application No. PCT/JP2014/067412 filed on Jun. 30, 2014, the disclosure of which is incorporated herein by reference.

FIELD

The present invention relates to a heating and hot water supply system having a hot water storage tank.

BACKGROUND

A heating and hot water supply system disclosed in the following PTL 1 includes a heat pump for heating a liquid heat medium, a hot water storage tank, a tank-heat exchanger provided on a lower part in the hot water storage tank, a room heater, a circuit for circulating the heat medium to the tank-heat exchanger, and a circuit for circulating the heat medium to the room heater. This heating and hot water supply system performs room-heating by circulating the heat medium heated by the heat pump to the room heater and stores hot water in the hot water storage tank by circulating the heat medium heated by the heat pump to the tank-heat exchanger.

CITATION LIST

Patent Literature

[PTL 1] JP 2013-155911 A

SUMMARY

Technical Problem

The heating and hot water supply system in PTL 1 heats water in the hot water storage tank by the tank-heat exchanger located in a tank lower part. The higher a temperature of the water rises, the smaller the density of the water becomes. The heated water diffuses to a tank upper part by buoyancy generated by a density difference. As a result, the temperature of the water in the entire tank rises. A heat accumulating operation of the heating and hot water supply system in PTL 1 is of a circulation heating type in which the temperature of the water in the entire tank is gradually heated by repeated circulation of the heat medium between the heat pump and the tank-heat exchanger. When the heat accumulating operation of the heating and hot water supply system in PTL 1 is finished, the temperature of the entire tank matches a target heating temperature.

There are various hot water supply ends including a shower, a kitchen faucet, a dishwasher and the like, for example. A required hot water temperature is different depending on an application of the hot water end. A temperature of approximately 40° C., for example, is sufficient for the shower and the kitchen faucet. The dishwasher needs a temperature higher than the other applications and requires the temperature of approximately 55° C., for example. If the dishwasher uses hot water at the temperature of 55° C., the hot water storage tank needs to store hot water at least at 55° C. In that case, the heating and hot water supply system in PTL 1 is forced to heat the water in the entire tank to 55° C.

The higher the heating temperature rises, the lower the operation efficiency of the heat pump becomes. For example, the operation efficiency of the heat pump is poorer at the heating temperature of 55° C. as compared with the heating temperature of 45° C. That is, electricity consumption is larger in a case of heating from 50° C. to 55° C. than in a case of heating from 40° C. to 45° C. The dishwasher has an extremely small hot water supply amount per day as compared with the other applications, that is, hot water supply for the shower or the kitchen. That is, a required amount of high-temperature hot water supply is small. To raise the temperature of the water in the entire tank for a small amount of high-temperature hot water supply worsens the operation efficiency of the heat pump, which is not desirable. The higher the stored hot water temperature is, the larger a loss due to heat dissipation from the tank is caused. From this point of view, too, to raise the temperature of the entire tank is not desirable.

The present invention was made in order to solve the aforementioned problem, and has an object to provide a heating and hot water supply system that can reduce energy consumption.

Solution to Problem

A heating and hot water supply system of the invention includes: a hot water storage tank; a liquid heater configured to heat a liquid; a liquid-water heat exchanger configured to exchange heat between the liquid and water; a liquid pump configured to pump the liquid; a water pump configured to pump the water; a room heater configured to heat a room using heat of the liquid; a water-heating circuit configured to circulate the liquid between the liquid heater and the liquid-water heat exchanger; a room-heating circuit configured to circulate the liquid between the liquid heater and the room heater; a first valve configured to switch between the water-heating circuit and the room-heating circuit; a lower outward path configured to lead the water from a lower part of the hot water storage tank to the liquid-water heat exchanger; an upper return path configured to lead the water from the liquid-water heat exchanger to an upper part of the hot water storage tank; a middle outward path configured to lead the water from a middle part of the hot water storage tank to the liquid-water heat exchanger, the middle part being above the lower part and below the upper part; a middle return path configured to lead the water from the liquid-water heat exchanger to the middle part of the hot water storage tank; a second valve configured to switch between the lower outward path and the middle outward path; a third valve configured to switch between the upper return path and the middle return path; a middle hot water supply pipe connected to the middle part of the hot water storage tank; and an upper hot water supply pipe connected to the upper part of the hot water storage tank.

Advantageous Effect of Invention

According to the heating and hot water supply system of the present invention, energy consumption can be reduced.

DESCRIPTION OF EMBODIMENTS

Figure 1:
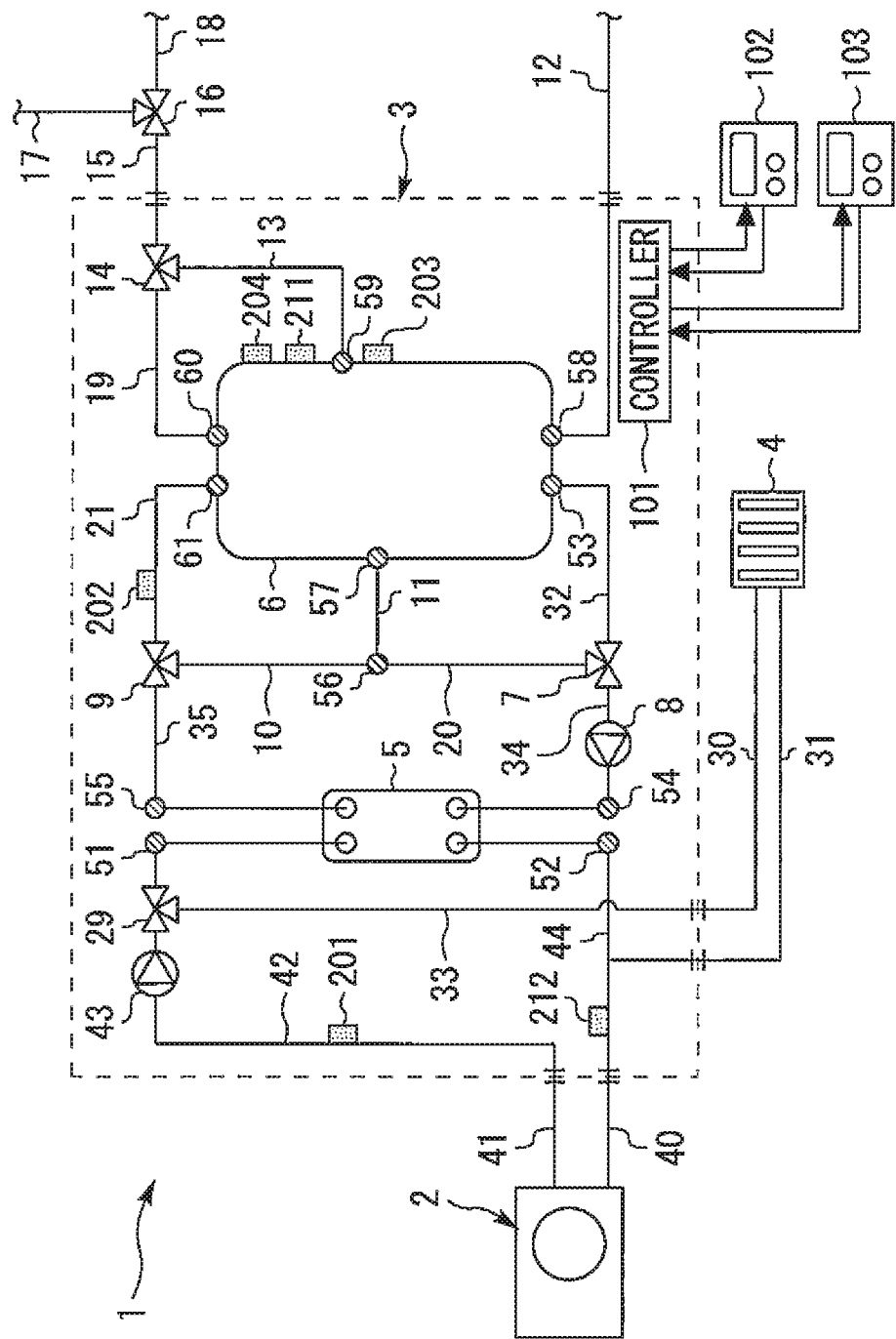
FIG. 1 is a configuration diagram illustrating a heating and hot water supply system according to embodiment 1 of the present invention.

Embodiments of the present invention will be described below by referring to the attached drawings. Common elements in each figure are given the same reference numerals and duplicated explanation will be omitted.

Embodiment 1

FIG. 1 is a configuration diagram illustrating a heating and hot water supply system according to embodiment 1 of the present invention. The heating and hot water supply system 1 according to this embodiment 1 illustrated in FIG. 1 is a system for performing room-heating and hot water supply in typical households. The heating and hot water supply system 1 includes a heat pump unit 2 for heating a liquid, a hot water storage unit 3 incorporating a hot water storage tank 6, and a room heater 4. A liquid pipe 40 and a liquid pipe 41 connect the heat pump unit 2 and the hot water storage unit 3 to each other. A liquid pipe 30 and a liquid pipe 31 connect the hot water storage unit 3 and the room heater 4 to each other. To the hot water storage unit 3, a feed-water pipe 12 and a hot water supply pipe 15 are connected. The hot water supply pipe 15 is connected to a mixing valve 16 outside the hot water storage unit 3. To the mixing valve 16, the feed-water pipe 17 and the hot water supply pipe 18 are connected. The feed-water pipes 12 and 17 feed water from a water source such as waterworks. The hot water supply pipe 18 is connected to a hot water supply end which will be described later. In the following explanation, the water supplied from the feed-water pipes 12 and 17 or water at a temperature close to that will be called "low temperature water" in some cases.

The heat pump unit 2 is a liquid heater having a function of heating a liquid. This liquid works as a heat medium. In this embodiment 1, water is used as this liquid. The liquid flows in an order of a liquid pipe 40, the heat pump unit 2, and the liquid pipe 41. Refrigerant in a refrigerant circuit provided in the heat pump unit 2 is not particularly limited but HFC refrigerants such as R410A and R32 or natural refrigerants such as hydrocarbon are preferable. In the present invention, the liquid heated by the liquid heater is not limited to water. An antifreeze liquid or brine may be used as a liquid. By using the antifreeze liquid or brine as the liquid, freezing in a cold region can be reliably prevented.

The room heater 4 can be constituted by a radiator, a fan coil and the like, for example. The room heater 4 is installed indoors. The mixing valve 16 can adjust a mixing ratio between hot water flowing in from the hot water supply pipe 15 and water flowing in from a feed-water pipe 17. The temperature of hot water flowing to the hot water supply pipe 18 can be adjusted by the mixing valve 16.

The liquid pipe 41 is connected to the liquid pipe 42 in the hot water storage unit 3. The liquid pipe 42 is connected to a three-way valve 29 (first valve). To the middle of the liquid pipe 42, a liquid pump 43 is arranged. To the three-way valve 29, a pipe leading to a connection portion 51 and a liquid pipe 33 are further connected. The connection portion 51 leads to a liquid inlet of a liquid-water heat exchanger 5. The liquid pipe 40 is connected to a liquid pipe 44 in the hot water storage unit 3. The liquid pipe 44 is connected to a connection portion 52. The connection portion 52 leads to a liquid outlet of the liquid-water heat exchanger 5. The liquid pipe 33 is connected to the liquid pipe 30. The liquid pipe 31 leads to the middle of the liquid pipe 44 in the hot water storage unit 3.

The hot water storage tank 6 includes a connection port 53, a connection port 57, a connection port 58, a connection port 59, a connection port 60, and a connection port 61. The connection port 53 and the connection port 58 are arranged on a lower part of the hot water storage tank 6. The lower part of the hot water storage tank 6 is a term referring not only to a lowermost part but also to a portion on a lower side of the hot water storage tank 6. For example, a range from the lowermost part of the hot water storage tank 6 to a height of ⅓ of the hot water storage tank 6 may be referred to as the lower part of the hot water storage tank 6. In this embodiment 1, the connection port 53 and the connection port 58 are located on the lowermost part of the hot water storage tank 6 or its vicinity.

The connection port 60 and the connection port 61 are arranged on an upper part of the hot water storage tank 6. The upper part of the hot water storage tank 6 is a term referring not only to an uppermost part of the hot water storage tank 6 but also to a portion on an upper side of the hot water storage tank 6. For example, a range from the uppermost part of the hot water storage tank 6 to a height of ⅔ of the hot water storage tank 6 may be referred to as the upper part of the hot water storage tank 6. In this embodiment 1, the connection port 60 and the connection port 61 are located on the uppermost part of the hot water storage tank 6 or its vicinity.

The connection port 57 and the connection port 59 are arranged in a middle part of the hot water storage tank 6. The middle part of the hot water storage tank 6 is a term referring to a portion above the lower part of the hot water storage tank 6 and below the upper part of the hot water storage tank 6. For example, a range from the height of ⅓ of the hot water storage tank 6 to the height of ⅔ of the hot water storage tank 6 may be referred to as the middle part of the hot water storage tank 6.

A water pipe 32 connects the connection port 53 and a three-way valve 7 (second valve) to each other. To the three-way valve 7, a water pipe 20 and a water pipe 34 are further connected. The water pipe 34 is connected to a connection portion 54. The connection portion 54 leads to a water inlet of the liquid-water heat exchanger 5. In the middle of the water pipe 34, a water pump 8 is arranged. A water pipe 20 is connected to the connection portion 56. A water pipe 11 connects a connection portion 56 and the connection port 57 to each other. A water pipe 35 connects a connection portion 55 and a three-way valve 9 (third valve) to each other. The connection portion 55 leads to a water outlet of the liquid-water heat exchanger 5. To the three-way valve 9, a water pipe 10 and a water pipe 21 are further connected. The water pipe 10 is connected to the connection portion 56. The water pipe 21 is connected to the connection port 61.

The liquid pump 43 and the water pump 8 may be such that operating speeds (rotation speeds, for example) may be made variable by inverter control or the like or may be constant speeds. The three-way valve 7, the three-way valve 9, and the three-way valve 29 are channel switching valves. The liquid-water heat exchanger 5 exchanges heat of the liquid with the heat of the water. The liquid-water heat exchanger 5 can be constituted by a plate-type heat exchanger, for example. Instead of direct heating of the water by a high-temperature refrigerant in the heat pump unit 2, by heating the water in the liquid-water heat exchanger 5 through the liquid, even if water with high hardness is used, the channel can be reliably prevented from being blocked by scale. Even if the heat exchanger in the heat pump unit 2 is broken, mixing of the refrigerant and refrigerator oil into the water can be reliably prevented. By circulating not the water but the liquid through the room heater 4, stain in the channel in the room heater 4 can be reliably reduced.

In a medium-temperature heat accumulating operation and a high-temperature heat accumulating operation for accumulating heat in the hot water storage tank 6, the three-way valve 29 causes the liquid pump 43 and the liquid-water heat exchanger 5 to communicate with each other. In the medium-temperature heat accumulating operation and the high-temperature heat accumulating operation, the liquid heated by the heat pump unit 2 is circulated in the order of the liquid pipe 41, the liquid pipe 42, the liquid pump 43, the three-way valve 29, the connection portion 51, the liquid-water heat exchanger 5, the connection portion 52, the liquid pipe 44, and the heat pump unit 2. This liquid circuit corresponds to a water-heating circuit.

In a room-heating operation for heating with the room heater 4, the three-way valve 29 causes the liquid pump 43 and the liquid pipe 33 to communicate with each other. In the room-heating operation, the liquid heated by the heat pump unit 2 is circulated in the order of the liquid pipe 41, the liquid pipe 42, the liquid pump 43, the three-way valve 29, the liquid pipe 33, the liquid pipe 30, the room heater 4, the liquid pipe 31, and the heat pump unit 2. This liquid circuit corresponds to a room-heating circuit.

A path through which the water flows in the medium-temperature heat accumulating operation is as follows. The three-way valve 7 causes the water pipe 32 and the water pipe 34 to communicate with each other. The three-way valve 9 causes the water pipe 35 and the water pipe 10 to communicate with each other. The water in the lower part of the hot water storage tank 6 flows in the order of the connection port 53, the water pipe 32, the three-way valve 7, the water pipe 34, the water pump 8, and the connection portion 54 and is led to the liquid-water heat exchanger 5. This path corresponds to a lower outward path. The water having passed through the liquid-water heat exchanger 5 flows in the order of the connection portion 55, the water pipe 35, the three-way valve 9, the water pipe 10, the connection portion 56, the water pipe 11, and the connection port 57 and is led to the middle portion of the hot water storage tank 6. This path corresponds to a middle return path.

A path through which the water flows in the high-temperature heat accumulating operation is as follows. The three-way valve 7 causes the water pipe 20 and the water pipe 34 to communicate with each other. The three-way valve 9 causes the water pipe 35 and the water pipe 21 to communicate with each other. The water in the middle part of the hot water storage tank 6 flows in the order of the connection port 57, the water pipe 11, the connection portion 56, the water pipe 20, the three-way valve 7, the water pipe 34, the water pump 8, and the connection portion 54 and is led to the liquid-water heat exchanger 5. This path corresponds to a middle outward path. The water having passed through the liquid-water heat exchanger 5 flows in the order of the connection portion 55, the water pipe 35, the three-way valve 9, the water pipe 21, and the connection port 61 and is led to the upper part of the hot water storage tank 6. This path corresponds to an upper return path.

The three-way valve 29 can switch between the aforementioned water-heating circuit and the room-heating circuit. The three-way valve 7 can switch between the aforementioned lower outward path and the middle outward path. The three-way valve 9 can switch between the aforementioned middle return path and the upper return path.

A middle hot water supply pipe 13 connects the connection port 59 and a three-way valve 14 to each other. An upper hot water supply pipe 19 connects the connection port 60 and the three-way valve 14. To the three-way valve 14, the hot water supply pipe 15 is further connected. The three-way valve 14 is a channel switching valve. In the medium-temperature hot water supply, the three-way valve 14 causes the middle hot water supply pipe 13 and the hot water supply pipe 15 to communicate with each other. In the high-temperature hot water supply, the three-way valve 14 causes the upper hot water supply pipe 19 and the hot water supply pipe 15 to communicate with each other. The three-way valve 14 may be made a mixing valve.

The hot water storage tank 6 can store hot water heated by using the heat pump unit 2. In the hot water storage tank 6, temperature stratification with the upper side at a high temperature and the lower side at a low temperature can be formed. An inside of the hot water storage tank 6 is kept full. If the hot water in the hot water storage tank 6 flows out of the connection port 59 or the connection port 60, the same amount of water flows into the hot water storage tank 6 from the connection port 58.

A temperature sensor 201 detects a temperature of the liquid coming out of the heat pump unit 2. The temperature detected by the temperature sensor 201 will be hereinafter referred to as a "heat pump outlet temperature". A temperature sensor 202 detects a water temperature of the water pipe 21. The temperature detected by the temperature sensor 202 will be hereinafter referred to as a "upper return temperature". A temperature sensor 203 detects a water temperature of the middle part of the hot water storage tank 6. The temperature detected by the temperature sensor 203 will be hereinafter referred to as a "middle-water temperature". A temperature sensor 204 detects a water temperature of the upper part of the hot water storage tank 6. The temperature detected by the temperature sensor 204 will be hereinafter referred to as a "upper-water temperature". A temperature sensor 211 detects a water temperature of the upper part of the hot water storage tank 6. The temperature sensor 211 detects the water temperature at a position lower than the temperature sensor 204. The temperature detected by the temperature sensor 211 will be hereinafter referred to as a "second upper-water temperature". The temperature sensor 211 is arranged at a position lower than the temperature sensor 204 and higher than the temperature sensor 203. A temperature sensor 212 detects a temperature of a liquid entering the heat pump unit 2. The temperature detected by the temperature sensor 212 will be hereinafter referred to as a "heat pump inlet temperature".

Figure 2:
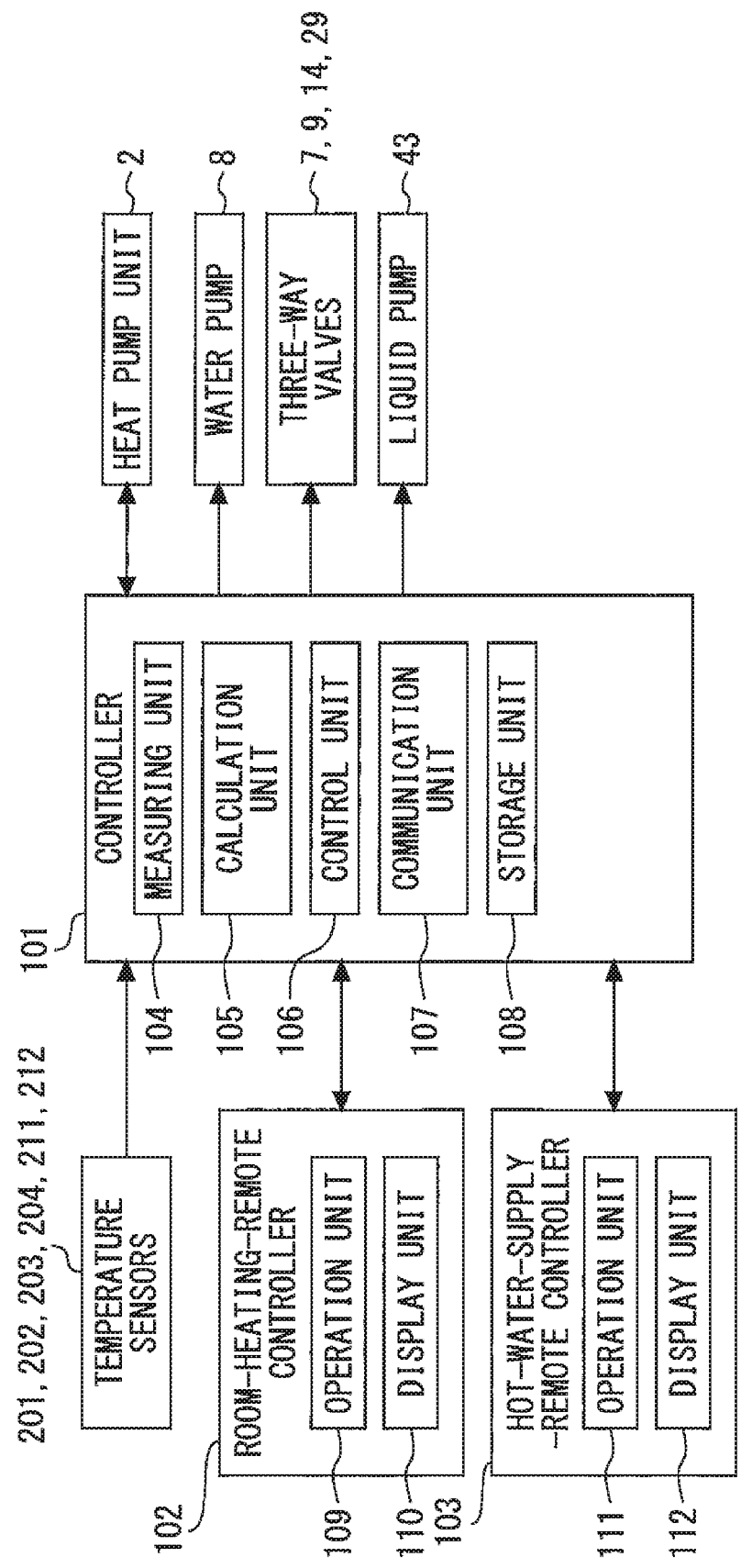
FIG. 2 is a block diagram illustrating configuration of a controller, a room-heating-remote controller, and a hot-water-supply-remote controller in the heating and hot water supply system according to embodiment 1 of the present invention.

FIG. 2 is a block diagram illustrating configuration of a controller 101, a room-heating-remote controller 102, and a hot-water-supply-remote controller 103 in the heating and hot water supply system 1 according to this embodiment 1 of the present invention. The controller 101 can be constituted by a microcomputer, for example. The controller 101 can control the medium-temperature heat accumulating operation, the high-temperature heat accumulating operation, the room-heating operation, and defrosting operation. The controller 101 includes a measuring unit 104, a calculation unit 105, a control unit 106, a communication unit 107, and a storage unit 108. The controller 101 further includes an input/output port (not shown) for input/output of an external signal. Various devices including the aforementioned heat pump unit 2, the water pump 8, the three-way valve 7, the three-way valve 9, the three-way valve 14, the three-way valve 29, and the liquid pump 43 and various sensors including the temperature sensors 201, 202, 203, 204, 211, and 212 are electrically connected to the controller 101.

The storage unit 108 includes a ROM, a RAM, a non-volatile memory, a semiconductor memory and the like. The storage unit 108 stores a set value and a control program and the like. The measuring unit 104 obtains information of a temperature, a pressure and the like of each part on the basis of information detected by each of the sensors. The calculation unit 105 performs calculation for a control operation of the heating and hot water supply system 1 on the basis of the information obtained by the measuring unit 104, instructions from the room-heating-remote controller 102 and the hot-water-supply-remote controller 103, the set value and the control program and the like stored in the storage unit 108. The control unit 106 controls each device on the basis of a calculation result of the calculation unit 105, the set value and the control program and the like stored in the storage unit 108. The room-heating-remote controller 102 and the hot-water-supply-remote controller 103 are communicably connected to the controller 101, respectively. The communication unit 107 conducts data communication with the room-heating-remote controller 102 and the hot-water-supply-remote controller 103 as well as external other devices through a communication line or wirelessly.

The room-heating-remote controller 102 and the hot-water-supply-remote controller 103 are installed indoors. The room-heating-remote controller 102 includes an operation unit 109 and a display unit 110. The operation unit 109 has switches into which a user inputs an instruction such as turning on/off or the like of a room-heating. The display unit 110 displays information relating to an operation state of the heating and hot water supply system 1 and the like. The hot-water-supply-remote controller 103 includes an operation unit 111 and a display unit 112. The operation unit 111 has switches into which the user inputs an instruction of a hot water supply temperature and the like. The display unit 112 displays the information relating to the operation state of the heating and hot water supply system 1, hot water supply temperature and the like.

Figure 3:
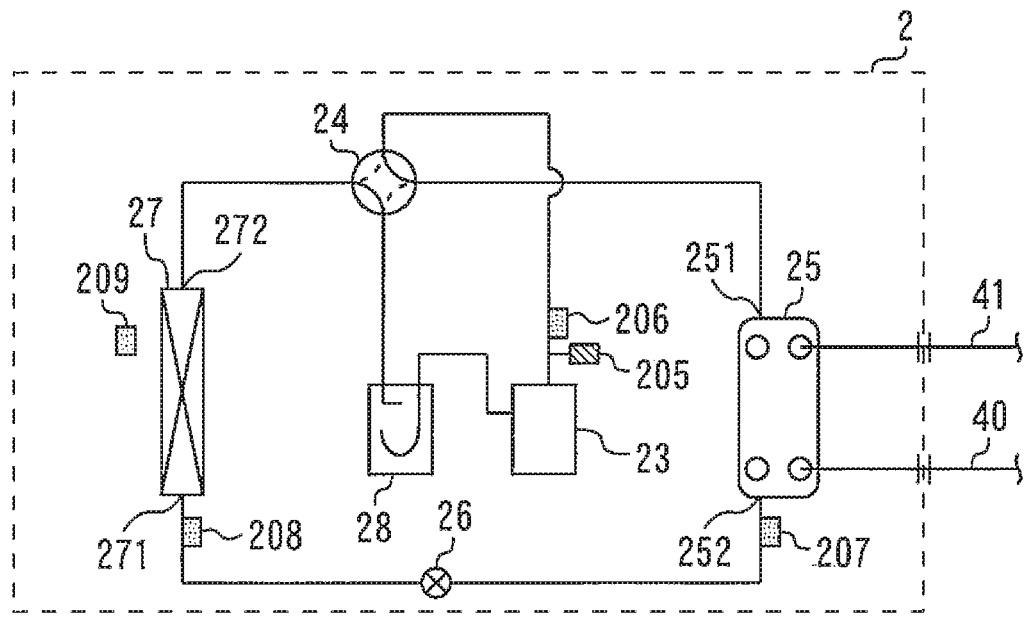
FIG. 3 is a refrigerant circuit diagram of a heat pump unit provided in the heating and hot water supply system according to embodiment 1 of the present invention.

FIG. 3 is a refrigerant circuit diagram of the heat pump unit 2 provided in the heating and hot water supply system 1 according to embodiment 1 of the present invention. As illustrated in FIG. 3, the heat pump unit 2 includes a refrigerant circuit including a compressor 23, a four-way valve 24, a refrigerant-liquid heat exchanger 25, an expansion valve 26, a refrigerant-air heat exchanger 27, and an accumulator 28. The compressor 23 suctions a low-pressure gas refrigerant, compresses it and discharges a high-temperature and high-pressure gas refrigerant. The compressor 23 is preferably capable of controlling a capacity. For example, by controlling an operating speed of the compressor 23 by inverter control, the capacity of the compressor 23 can be controlled. The four-way valve 24 is a switching valve for switching a destination of the refrigerant discharged from the compressor 23 to between the refrigerant-liquid heat exchanger 25 and the refrigerant-air heat exchanger 27. The refrigerant-liquid heat exchanger 25 exchanges heat between the refrigerant and the liquid. The refrigerant-liquid heat exchanger 25 has a first refrigerant port 251 and a second refrigerant port 252. As the refrigerant-liquid heat exchanger 25, a plate-type heat exchanger can be used, for example. The expansion valve 26 expands the high-pressure refrigerant and makes it the low-pressure refrigerant. The expansion valve 26 can adjust a refrigerant flowrate. The refrigerant-air heat exchanger 27 exchanges heat between the refrigerant and air (outside air). The refrigerant-air heat exchanger 27 has a first refrigerant port 271 and a second refrigerant port 272. As the refrigerant-air heat exchanger 27, a cross-fin type fin-and-tube heat exchanger constituted by a heat transfer pipe and a fin can be used, for example. The accumulator 28 can store the liquid refrigerant. By retaining the liquid refrigerant temporarily generated at a change of the operation state in the accumulator 28, inflow of a large quantity of the liquid refrigerant into the compressor 23 can be reliably prevented.

The heat pump unit 2 includes a pressure sensor 205, temperature sensors 206, 207, 208, and 209. The pressure sensor 205 detects a discharged refrigerant pressure of the compressor 23. The temperature sensor 206 detects a discharged refrigerant temperature of the compressor 23. The temperature sensor 207 detects a refrigerant temperature on the second refrigerant port 252 side of the refrigerant-liquid heat exchanger 25. The temperature sensor 208 detects a refrigerant temperature on the first refrigerant port 271 side of the refrigerant-air heat exchanger 27. The temperature sensor 209 detects an outside air temperature.

In this embodiment 1, the heat pump (heat pump unit 2) is used as the liquid heater for heating the water, but the liquid heater in the present invention is not limited to the heat pump but may be any type including a combustion type, an electric heater type and the like. In this embodiment 1, the liquid heater (heat pump unit 2) and the hot water storage unit 3 are separate bodies but in the present invention, the liquid heater and the hot water storage unit 3 may be integral.

Figure 4:
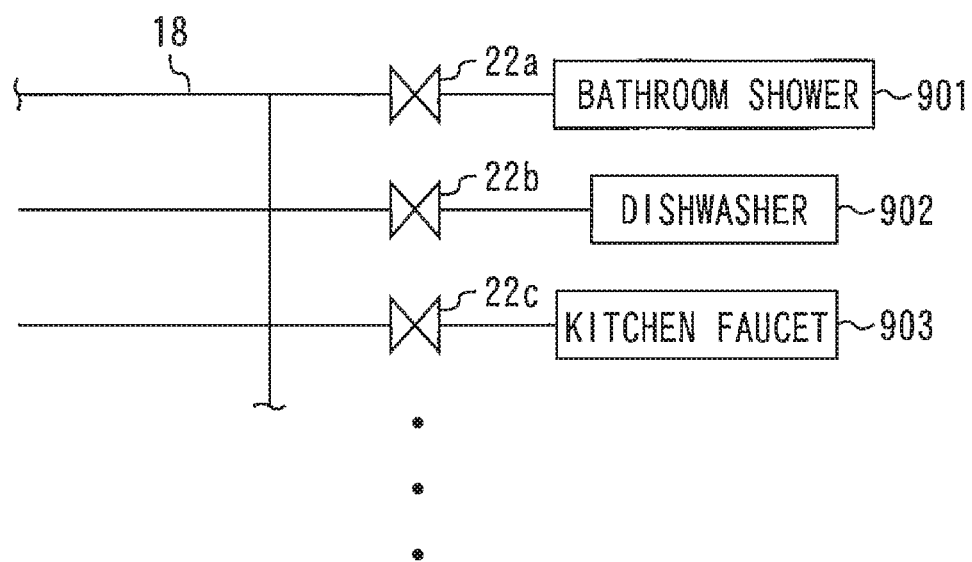
FIG. 4 is a diagram illustrating a configuration example of hot water supply ends in embodiment 1.

FIG. 4 is a diagram illustrating a configuration example of the hot water supply ends in this embodiment 1. The number and applications of the hot water supply ends are varied depending on the household. In the example illustrated in FIG. 4, the hot water ends include a bathroom shower 901, a dishwasher 902, a kitchen faucet 903 and the like. The hot water supply pipe 18 branches into a plurality of pipes and they are connected to the hot water supply ends, respectively. A valve 22a opens/closes a hot water supply channel to the bathroom shower 901. A valve 22b opens/closes a hot water supply channel to the dishwasher 902. A valve 22c opens/closes a hot water supply channel to the kitchen faucet 903.

(Initial Heat Accumulating Operation)

When an installation work of the heating and hot water supply system 1 is completed and an operation of the heating and hot water supply system 1 is to be started, the water in the hot water storage tank 6 is entirely low-temperature water. In the case where the heating and hot water supply system 1 is not used for a long time such as long-term absence of the house or the like, the water in the hot water storage tank 6 can be entirely low-temperature water. In the following explanation, a temperature of the low-temperature water is assumed to be 15° C. as an example. When power is turned on after the completion of the installation work of the heating and hot water supply system 1, an input request of the hot water supply set temperature of each of the hot water supply ends is displayed on the display unit 112 of the hot-water-supply-remote controller 103. When the user or a contractor or the like inputs a hot water supply set temperature for each of the hot water supply ends to this input request through the operation unit 111, the hot water supply set temperature of each of the hot water supply ends can be set. The hot water supply set temperature of each of the hot water supply ends is stored in the storage unit 108 through the communication unit 107.

The calculation unit 105 determines the first set temperature and the second set temperature on the basis of the hot water supply set temperatures of the plurality of hot water supply ends stored in the storage unit 108. The second set temperature is a temperature lower than the first set temperature. The calculation unit 105 may determine the highest temperature in the hot water supply set temperatures of the plurality of hot water supply ends or a temperature slightly higher than that as the first set temperature. For example, the hot water supply set temperature of the dishwasher 902 or a temperature slightly higher than that can be the first set temperature. The calculation unit 105 may determine a second highest temperature in the hot water supply set temperatures of the plurality of hot water supply ends or a temperature slightly higher than that as the second set temperature. If a difference between the highest temperature in the hot water supply set temperatures of the plurality of hot water supply ends and the second highest temperature is small, the calculation unit 105 may determine a third highest temperature in the hot water supply set temperatures of the plurality of hot water supply ends or a temperature slightly higher than that as the second set temperature. In the following explanation, the first set temperature is assumed to be 55° C. and the second set temperature to be 45° C. as an example. The first set temperature is indicated by Tset1, the second set temperature by Tset2, the upper-water temperature to be Ttank1, and the middle-water temperature to be Ttank2.

Figure 5:
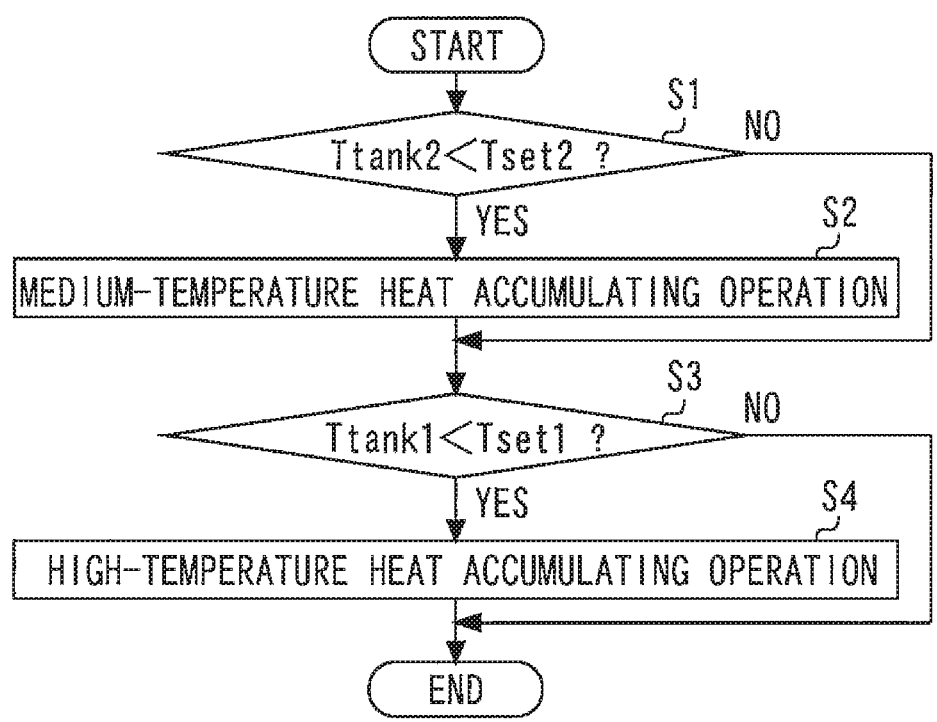
FIG. 5 is a flowchart illustrating a control operation of the controller of the heating and hot water supply system according to embodiment 1.

FIG. 5 is a flowchart illustrating a control operation of the controller 101 of the heating and hot water supply system 1 according to this embodiment 1. At Step S1 in FIG. 5, the controller 101 compares the middle-water temperature Ttank2 detected by the temperature sensor 203 with the second set temperature Tset2. If the middle-water temperature Ttank2 is lower than the second set temperature Tset2, the controller 101 proceeds to Step S2 and performs the medium-temperature heat accumulating operation. After the medium-temperature heat accumulating operation at Step S2 is finished, the controller 101 proceeds to Step S3. If the middle-water temperature Ttank2 is higher than the second set temperature Tset2 at Step S1, the controller 101 skips Step S2 and proceeds to Step S3.

The controller 101 compares the upper-water temperature Ttank1 detected by the temperature sensor 204 with the first set temperature Tset1 at Step S3. If the upper-water temperature Ttank1 is lower than the first set temperature Tset1, the controller 101 proceeds to Step S4 and performs the high-temperature heat accumulating operation. At Step S3, if the upper-water temperature Ttank1 is higher than the first set temperature Tset1, the controller 101 skips Step S4 and finishes processing of this flowchart.

(Medium-Temperature Heat Accumulating Operation)

The medium-temperature heat accumulating operation will be further explained below. The medium-temperature heat accumulating operation is an operation for accumulating heat in the hot water storage tank 6 by operating the heat pump unit 2, the water-heating circuit, the lower outward path, and the middle return path. The controller 101 preferably makes the operating speed of the liquid pump 43 constant and more preferably fixes the operating speed of the liquid pump 43 to a maximum speed. Then, a temperature difference of the liquid between the inlet and the outlet of the liquid-water heat exchanger 5 is made smaller, and the inlet temperature of the heat pump can be kept low, whereby electricity consumption can be reduced. The controller 101 preferably makes the operating speed of the water pump 8 constant and more preferably fixes the operating speed of the water pump 8 to a maximum speed. Then, a temperature difference of the water between the inlet and the outlet of the liquid-water heat exchanger 5 is made smaller, and the inlet temperature of the heat pump can be kept low, whereby electricity consumption can be reduced. The controller 101 may finish the medium-temperature heat accumulating operation when the middle-water temperature Ttank2 detected by the temperature sensor 203 becomes the second set temperature Tset2 or more. The controller 101 may continue the medium-temperature heat accumulating operation until the water temperature in the lower part of the hot water storage tank 6 becomes the second set temperature Tset2 or a temperature close to that. In the following explanation, the water at the second set temperature Tset2 or the temperature close to that is called "medium-temperature water" in some cases.

A heating operation of the heat pump unit 2 in the medium-temperature heat accumulating operation will be described below. The refrigerant discharged from the compressor 23 is circulated in the order of the four-way valve 24, the first refrigerant port 251, the refrigerant-liquid heat exchanger 25, the second refrigerant port 252, the expansion valve 26, the first refrigerant port 271, the refrigerant-air heat exchanger 27, the second refrigerant port 272, the four-way valve 24, the accumulator 28, and the compressor 23. The high-temperature and high-pressure refrigerant discharged from the compressor 23 flows into the refrigerant-liquid heat exchanger 25. The refrigerant is cooled in the refrigerant-liquid heat exchanger 25, and the liquid is heated. The pressure of the refrigerant cooled in the refrigerant-liquid heat exchanger 25 is reduced by the expansion valve 26. The low-pressure refrigerant with its pressure reduced by the expansion valve 26 absorbs heat of the outside air in the refrigerant-air heat exchanger 27 and evaporates. The refrigerant having absorbed the heat in the refrigerant-air heat exchanger 27 is suctioned into the compressor 23 through the four-way valve 24 and the accumulator 28.

(High-Temperature Heat Accumulating Operation)

The high-temperature heat accumulating operation will be further explained below. The high-temperature heat accumulating operation is an operation for accumulating heat in the hot water storage tank 6 by operating the heat pump unit 2, the water-heating circuit, the middle outward path, and the upper return path. The heating operation of the heat pump unit 2 in the high-temperature heat accumulating operation is the same as the operation in the medium-temperature heat accumulating operation. The controller 101 preferably makes the operating speed of the liquid pump 43 constant and more preferably fixes the operating speed of the liquid pump 43 to a maximum speed. Then, a temperature difference of the liquid between the inlet and the outlet of the liquid-water heat exchanger 5 is made smaller, and the inlet temperature of the heat pump can be kept low, whereby electricity consumption can be reduced. Preferably, the controller 101 controls the operating speed of the water pump 8 so that the upper return temperature detected by the temperature sensor 202 becomes the first set temperature Tset1 or more. A heating power of the heat pump unit 2 immediately after start is small. By controlling the water pump 8 as above, even while the heating power of the heat pump unit 2 is small, drop of the temperature of the hot water flowing into the upper part of the hot water storage tank 6 can be reliably reduced. The controller 101 may finish the high-temperature heat accumulating operation when the second upper-water temperature Ttank3 detected by the temperature sensor 211 becomes the first set temperature Tset1 or more. In the following explanation, the water at the first set temperature Tset1 or a temperature close to that is called "high-temperature water" in some cases. When the high-temperature heat accumulating operation is finished, the water in the hot water storage tank 6 above a position of the temperature sensor 211 becomes the high-temperature water, while the water in the hot water storage tank 6 below the position of the temperature sensor 211 remains the medium-temperature water. In this embodiment 1, by determining the first set temperature Tset1 on the basis of the highest temperature in the hot water supply set temperatures at the plurality of hot water supply ends, the temperature of the high-temperature water in the hot water storage tank 6 can be made a temperature without excess or shortage. Thus, convenience and reduction of electricity consumption can be both realized.

The medium-temperature heat accumulating operation is of a circulation heating type in which the water in the hot water storage tank 6 is circulated a plurality of times to the liquid-water heat exchanger 5. The circulation heating type has efficiency higher than a once-through heating type which will be described later. In typical households, a demand for the medium-temperature water is high, while a demand for the high-temperature water is small. According to this embodiment 1, by performing the medium-temperature heat accumulating operation for generating the medium-temperature water with high demand in the highly efficient circulation heating type, electricity consumption can be reduced.

The high-temperature heat accumulating operation is the once-through heating type in which the water in the hot water storage tank 6 passes through the liquid-water heat exchanger 5 only once. According to this embodiment 1, the high-temperature water can be generated over the medium-temperature water in the hot water storage tank 6 by performing the high-temperature heat accumulating operation. Thus, when the high-temperature water is demanded, the entire water in the hot water storage tank 6 does not have to be made the high-temperature water. Thus, electricity consumption can be reduced. In the high-temperature heat accumulating operation, the medium-temperature water is heated to the high-temperature water by the liquid-water heat exchanger 5. Thus, as compared with the case where the low-temperature water is heated to the high-temperature water, consumed energy and required time can be reduced. In the high-temperature heat accumulating operation, the liquid heated by the heat pump unit 2 is circulated to the liquid-water heat exchanger 5 a plurality of times. Thus, as compared with the case of the once-through heating type heating by configuration of direct heat exchange between the refrigerant and the water in the heat pump, efficiency is improved, and electricity consumption can be reduced.

(Room-Heating Operation)

The room-heating operation will be further explained below. The room-heating operation is to operate the heat pump unit 2 and the room-heating circuit and is an operation of circulating the liquid heated by the heat pump unit 2 to the room heater 4. The heating operation of the heat pump unit 2 in the room-heating operation is the same as the operation in the medium-temperature heat accumulating operation and the high-temperature heat accumulating operation. The controller 101 preferably makes the operating speed of the liquid pump 43 constant and more preferably fixes the operating speed of the liquid pump 43 to a maximum speed. Then, a temperature difference of the liquid between the inlet and the outlet of the room heater 4 is made smaller, and the inlet temperature of the heat pump can be kept low, whereby electricity consumption can be reduced. The water pump 8 is brought into a stop state. The three-way valve 7 may cause the water pipe 32 and the water pipe 34 to communicate with each other. The three-way valve 9 may cause the water pipe 35 and the water pipe 10 to communicate with each other.

The control executed by the controller 101 to the heat pump unit 2 in the medium-temperature heat accumulating operation, the control executed by the controller 101 to the heat pump unit 2 in the high-temperature heat accumulating operation, and the control executed by the controller 101 to the heat pump unit 2 in the room-heating operation are preferably the same as the others. In other words, the controller 101 preferably executes common control to the heat pump unit 2 in any of the medium-temperature heat accumulating operation, the high-temperature heat accumulating operation, and the room-heating operation. By constituting as above, since there is no need to change the operation of the heat pump unit 2 when the operation is switched among the medium-temperature heat accumulating operation, the high-temperature heat accumulating operation, and the room-heating operation, the operation can be switched smoothly and rapidly, and an energy loss at switching can be reduced.

The control executed by the controller 101 to the liquid pump 43 in the medium-temperature heat accumulating operation, the control executed by the controller 101 to the liquid pump 43 in the high-temperature heat accumulating operation, and the control executed by the controller 101 to the liquid pump 43 in the room-heating operation are preferably the same as the others. In other words, the controller 101 preferably executes common control to the liquid pump 43 in any of the medium-temperature heat accumulating operation, the high-temperature heat accumulating operation, and the room-heating operation. By constituting as above, since there is no need to change the operation of the liquid pump 43 when the operation is switched among the medium-temperature heat accumulating operation, the high-temperature heat accumulating operation, and the room-heating operation, the operation can be switched smoothly and rapidly, and an energy loss at switching can be reduced.

(Hot Water Supply Operation)

When hot water is to be supplied to the hot water supply end with a high hot water supply set temperature such as the dishwasher 902, for example, the controller 101 causes the upper hot water supply pipe 19 and the hot water supply pipe 15 to communicate with each other by the three-way valve 14. As a result, the high-temperature water can be supplied from the upper hot water supply pipe 19 to the hot water supply pipe 15. When hot water is to be supplied to the hot water supply end with a hot water supply set temperature which is not so high such as the bathroom shower 901 or the kitchen faucet 903, for example, the controller 101 causes the middle hot water supply pipe 13 and the hot water supply pipe 15 to communicate with each other by the three-way valve 14. As a result, the medium-temperature water can be supplied from the middle hot water supply pipe 13 to the hot water supply pipe 15. As a result, a use amount of the high-temperature water is reduced, while the medium-temperature water can be used with priority, whereby energy efficiency can be improved.

A position where the middle hot water supply pipe 13 and the hot water storage tank 6 are connected, that is, a position of the connection port 59 is preferably above the position of the temperature sensor 203 and also lower than the position of the temperature sensor 211. As a result, the following effect can be obtained. If the middle-water temperature Ttank2 detected by the temperature sensors 203 becomes lower than the second set temperature Tset2, the medium-temperature heat accumulating operation can be performed. Thus, the medium-temperature water is expected to be reliably present at the position of the temperature sensor 203 and above. Thus, by setting the position of the connection port 59 above the position of the temperature sensor 203, the medium-temperature water is expected to be reliably present at the position of the connection port 59. Thus, the medium-temperature water can be reliably supplied from the connection port 59 to the middle hot water supply pipe 13. When the second upper-water temperature Ttank3 detected by the temperature sensor 211 becomes the first set temperature Tset1 or more, the high-temperature heat accumulating operation can be finished. Thus, the water in the hot water storage tank 6 below the position of the temperature sensor 211 is expected to remain to be the medium-temperature water. Thus, by setting the position of the connection port 59 below the position of the temperature sensor 211, it can be expected that the high-temperature water is not present but the medium-temperature water is reliably present at the position of the connection port 59. From these facts, the medium-temperature water can be reliably supplied from the connection port 59 to the middle hot water supply pipe 13.

(Heat Re-Accumulating Action)

If the heat accumulated amount of the hot water storage tank 6 decreases by the hot water supply operation, an inequality sign at Step S1 or Step S3 in the flowchart in FIG. 5 can be made true again. For example, if the medium-temperature water is consumed, the inequality sign at Step S holds true, and the medium-temperature heat accumulating operation of a beat re-accumulating action can be performed. For example, if the high-temperature water is consumed, the inequality sign at Step S3 holds true, and the high-temperature heat accumulating operation of a heat re-accumulating action can be performed.

Figure 6:
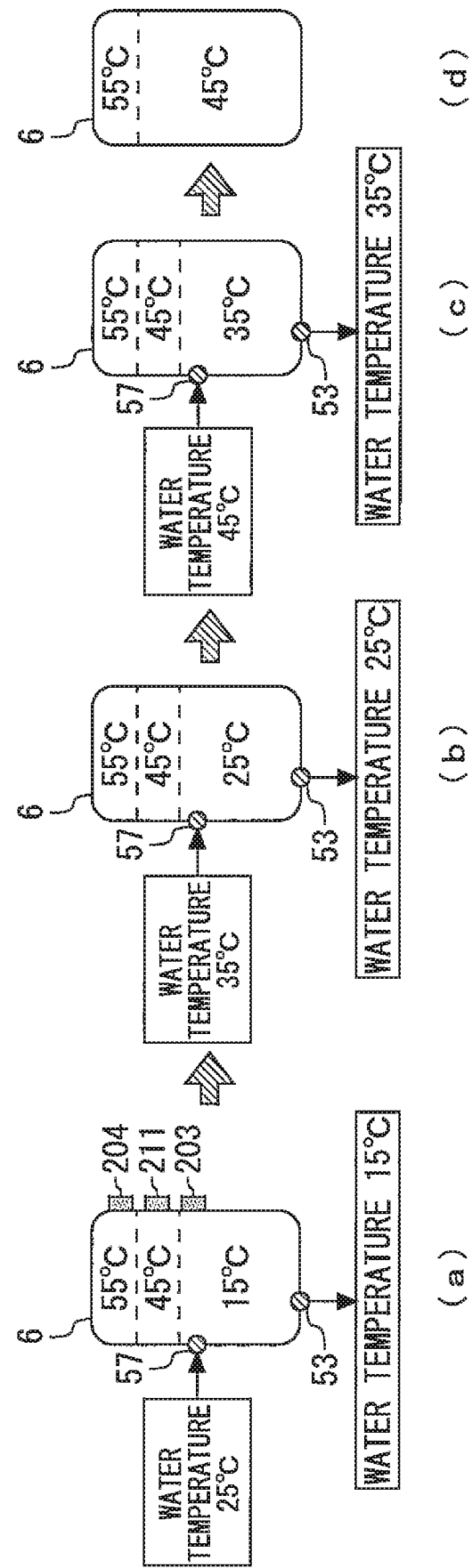
FIG. 6 is a diagram illustrating a water temperature change in a hot water storage tank in a medium-temperature heat accumulating operation of a heat re-accumulating action in embodiment 1.

FIG. 6 is a diagram illustrating a water temperature change in the hot water storage tank 6 in the medium-temperature heat accumulating operation of the heat re-accumulating action in this embodiment 1. At start of this medium-temperature heat accumulating operation, water temperature distribution of the hot water storage tank 6 is as illustrated in (a) in FIG. 6. The temperature of the water led out of the connection port 53 of the hot water storage tank 6 rises only by a certain temperature difference in the heat pump unit 2 and the water returns to the connection port 57. In the following explanation, this certain temperature difference is assumed to be 10° C. (10K), for example. In (a) in FIG. 6, the water at 15° C. led out of the connection port 53 is heated to 25° C. in the heat pump unit 2. This heated water flows into the hot water storage tank 6 from the connection port 57. The water flowing into the hot water storage tank 6 from the connection port 57 is hereinafter referred to as "return water". The return water diffuses upward from the connection port 57 by buoyancy caused by a density difference. In a region at the temperature of the return water and above, the buoyancy does not act to the return water. Thus, the return water at 25° C. collects below the layer at 45° C. in (a) in FIG. 6. As a result, the temperature distribution changes from (a) in FIG. 6 to (b) in FIG. 6.

In (b) in FIG. 6, the water at 25° C. led out of the connection port 53 is heated to 35° C. in the heat pump unit 2. This return water at 35° C. flows into the hot water storage tank 6 from the connection port 57 and collects below the layer of 45° C. As a result, the temperature distribution changes from (b) in FIG. 6 to (c) in FIG. 6.

In (c) in FIG. 6, the water at 35° C. led out of the connection port 53 is heated to 45° C. in the heat pump unit 2. This return water at 45° C. flows into the hot water storage tank 6 from the connection port 57, merges with the layer at 45° C. having been present from the beginning and further collects below that. As a result, the temperature distribution changes from (c) in FIG. 6 to (d) in FIG. 6. When a state in (d) in FIG. 6 is brought about, the controller 101 finishes the medium-temperature heat accumulating operation of the heat re-accumulating action.

A position where the middle return path and the hot water storage tank 6 are connected, that is, a position of the connection port 57 is preferably lower than or at the same height as the position of the temperature sensor 203. When the medium-temperature heat accumulating operation is started on the basis of the middle-water temperature detected by the temperature sensor 203, as illustrated in (a) in FIG. 6, the medium-temperature water can be present above the temperature sensor 203. At this time, assuming that the position of the connection port 57 is above the position of the temperature sensor 203, the medium-temperature water can be present in a region below the connection port 57 and above the temperature sensor 203. If the temperature of the medium-temperature water in this region lowers due to mixing of the return water flowing in from the connection port 57 with the medium-temperature water in this region, an energy loss is caused. In contrast, if the position of the connection port 57 is lower than or at the same height as the position of the temperature sensor 203, the energy loss caused by the temperature drop of the medium-temperature water as described above can be reliably avoided.

From the aforementioned reasons, the position where the middle hot water supply pipe 13 and the hot water storage tank 6 are connected, that is, the position of the connection port 59 is preferably above the position of the temperature sensor 203, and the position where the middle return path and the hot water storage tank 6 are connected, that is, the position of the connection port 57 is preferably lower than or at the same height as the position of the temperature sensor 203. Thus, the position where the middle hot water supply pipe 13 and the hot water storage tank 6 are connected, that is, the position of the connection port 59 is preferably above the position where the middle return path and the hot water storage tank 6 are connected, that is, the position of the connection port 57. In this embodiment 1, as illustrated in FIG. 1, the temperature sensor 203 is located at a position of approximately ½ of the height of the hot water storage tank 6, but the position of the temperature sensor 203 may be below or above the position of ½ of the height of the hot water storage tank 6.

Figure 7:
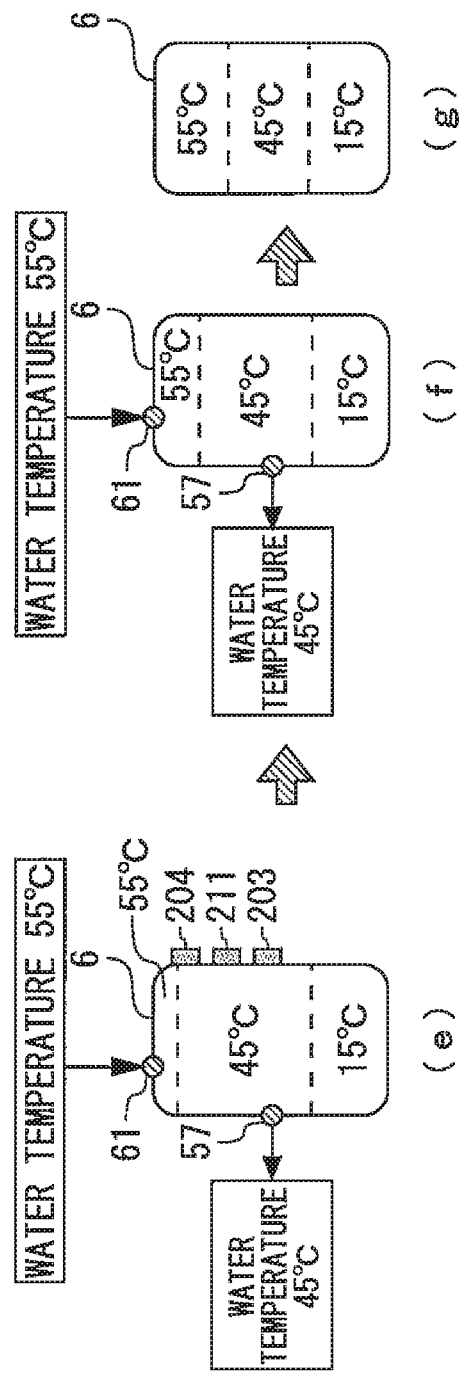
FIG. 7 is a diagram illustrating a water temperature change in the hot water storage tank in a high-temperature heat accumulating operation of the heat re-accumulating action in embodiment 1.

FIG. 7 is a diagram illustrating a water temperature change in the hot water storage tank 6 in the high-temperature heat accumulating operation of the heat re-accumulating action in this embodiment 1. At start of this high-temperature heat accumulating operation, the water temperature distribution of the hot water storage tank 6 is as illustrated in (e) in FIG. 7. The medium-temperature water (45° C.) led out of the connection port 57 is heated to the high-temperature water (55° C.) in the heat pump unit 2. This high-temperature water flows into the hot water storage tank 6 from the connection port 61, whereby the layer of the high-temperature water (55° C.) expands downward. As a result, the temperature distribution changes from (e) in FIG. 7 via (f) in FIG. 7 to (g) in FIG. 7. When a state illustrated in (g) in FIG. 7 is brought about, the controller 101 finishes the high-temperature heat accumulating operation of the heat re-accumulating action.

According to this embodiment 1, by performing the medium-temperature heat accumulating operation and the high-temperature heat accumulating operation, the high-temperature water and the medium-temperature water can be stratified in the hot water storage tank 6. Thus, without raising the temperature of the entire hot water storage tank 6, the high-temperature water can be used. In general, operation efficiency when the high-temperature water is generated is low. According to this embodiment 1, since the generation amount of the high-temperature water can be reduced, electricity consumption can be drastically reduced. Since the amount of the high-temperature water in the hot water storage tank 6 can be reduced, a loss due to heat dissipation from the hot water storage tank 6 can be also reduced.

A position where the middle hot water supply pipe 13 and the hot water storage tank 6 are connected, that is, the position of the connection port 59 is preferably above the position where the middle outward path and the hot water storage tank 6 are connected, that is, the position of the connection port 57. The reason is as follows. Heat dissipation from the hot water storage tank 6 gradually lowers the temperature of the hot water in the hot water storage tank 6. In FIG. 7, in order to facilitate the explanation, the entire layer of the medium-temperature water is expressed as 45° C. Actually, heat dissipation from the hot water storage tank 6 can generate temperature distribution in the layer of the medium-temperature water. For example, a top part of the medium-temperature water layer becomes 45° C. or a temperature close to that, while a lower part of the medium-temperature water layer can become a temperature lower than that. As illustrated in FIG. 7, when the high-temperature heat accumulating operation is performed, a boundary layer between the high-temperature water and the medium-temperature water moves downward, and the top part of the medium-temperature water layer also moves downward. If the position where the middle hot water supply pipe 13 and the hot water storage tank 6 are connected, that is, the position of the connection port 59 is above the position where the middle outward path and the hot water storage tank 6 are connected, that is, the position of the connection port 57, hot water can be supplied from the top part of the medium-temperature water layer having moved downward to the middle hot water supply pipe 13. Thus, drop of the temperature of the medium-temperature water supplied to the middle hot water supply pipe 13 can be reliably reduced. In contrast, assuming that the position where the middle hot water supply pipe 13 and the hot water storage tank 6 are connected, that is, the position of the connection port 59 is below the position where the middle outward path and the hot water storage tank 6 are connected, that is, the position of the connection port 57, the medium-temperature water at the position of the connection port 59 does not move downward when the high-temperature heat accumulating operation is performed, and thus, the aforementioned effect cannot be obtained.

As illustrated in FIG. 1, in this embodiment 1, the position where the middle outward path and the hot water storage tank 6 are connected and the position where the middle return path and the hot water storage tank 6 are connected are both served by the connection port 57. Thus, the configuration can be simplified. In the present invention, the position where the middle outward path and the hot water storage tank 6 are connected and the position where the middle return path and the hot water storage tank 6 are connected may be separate. In that case, a height of the position where the middle outward path and the hot water storage tank 6 are connected and a height of the position where the intermediate return path and the hot water storage tank 6 are connected may be different.

The controller 101 preferably starts the liquid pump 43 before starting the heat pump unit 2 when it starts the heat pump unit 2 and the liquid pump 43 at start of the medium-temperature heat accumulating operation, the high-temperature heat accumulating operation or the room-heating operation. As a result, when the operation of the heat pump unit 2 is started, a rise of the liquid temperature in the heat pump unit 2 to an abnormal high temperature can be reliably prevented.

The controller 101 preferably starts the water pump 8 after starting the heat pump unit 2 when it starts the heat pump unit 2, the liquid pump 43, and the water pump 8 at start of the medium-temperature heat accumulating operation or the high-temperature heat accumulating operation. As a result, after the heated liquid begins to circulate in the liquid-water heat exchanger 5, the water begins to circulate. Thus, return of the insufficiently heated water to the hot water storage tank 6 can be prevented. Particularly, after start of the high-temperature heat accumulating operation, mixing of the insufficiently heated water with the high-temperature water in the upper part of the hot water storage tank 6 can be prevented.

From the aforementioned reasons, the controller 101 preferably starts the liquid pump 43 before starting the heat pump unit 2 and starts the water pump 8 after starting the heat pump unit 2 when starting the heat pump unit 2, the liquid pump 43, and the water pump 8.

When starting the water pump 8 at start of the high-temperature heat accumulating operation, the controller 101 may start the water pump 8 when the heat pump outlet temperature detected by the temperature sensor 201 becomes the first set temperature Tset1 or more. As a result, mixing of the insufficiently heated water with the high-temperature water in the upper part of the hot water storage tank 6 can be prevented.

Embodiment 2

Figure 8:
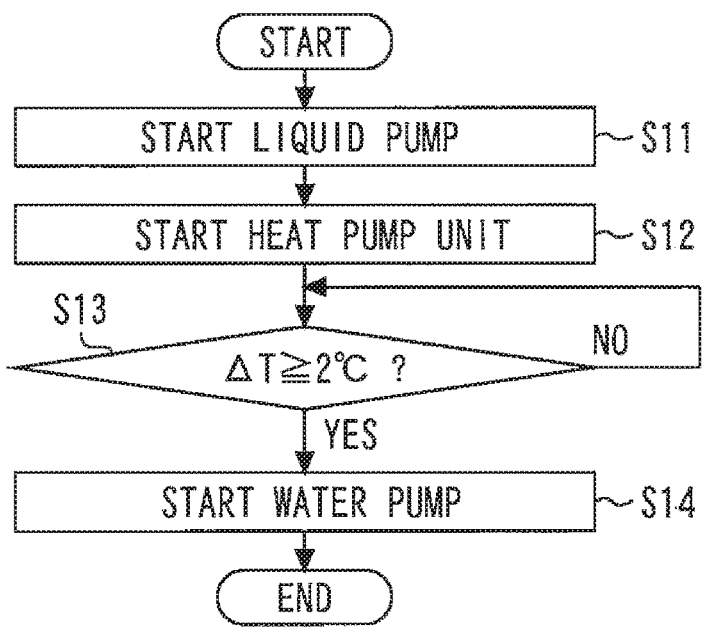
FIG. 8 is a flowchart illustrating a control operation of a controller of a heating and hot water supply system according to embodiment 2.

Subsequently, embodiment 2 of the present invention will be described by referring to FIG. 8 but differences from the aforementioned embodiment 1 will be mainly described, while the same or corresponding portions are given the same reference numerals and the explanation will be omitted. FIG. 8 is a flowchart illustrating a control operation of the controller 101 of the heating and hot water supply system 1 according to this embodiment 2.

FIG. 8 illustrates a control operation when the medium-temperature heat accumulating operation or the high-temperature heat accumulating operation is started. The controller 101 first starts the liquid pump 43 (Step S11). After that, the controller 101 starts the heat pump unit 2 (Step S12). Subsequently, the controller 101 compares a difference between the heat pump outlet temperature detected by the temperature sensor 201 and the heat pump inlet temperature detected by the temperature sensor 212 (hereinafter referred to as a "temperature difference $\Delta T$") with a threshold value (Step S13). This threshold value is 2° C. (2K), for example. The controller 101 does not start the water pump 8 if the temperature difference $\Delta T$ does not reach the threshold value and starts the water pump 8 after the temperature difference $\Delta T$ reaches the threshold value (Step S14).

According to this embodiment 2, the water pump 8 can be started after the fact that the liquid begins to be heated by the heat pump unit 2 is confirmed on the basis of the temperature difference $\Delta T$. Thus, return of the insufficiently heated water to the hot water storage tank 6 can be prevented. Particularly, mixing of the insufficiently heated water with the high-temperature water in the upper part of the hot water storage tank 6 after the start of the high-temperature heat accumulating operation can be prevented.

Embodiment 3

Figure 9:
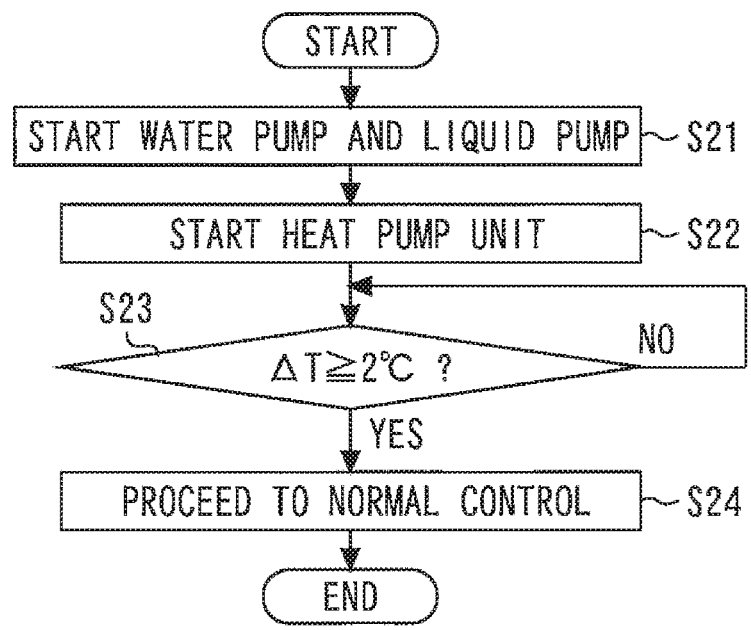
FIG. 9 is a flowchart illustrating a control operation of a controller of a heating and hot water supply system according to embodiment 3.

Subsequently, embodiment 3 of the present invention will be described by referring to FIG. 9 but differences from the aforementioned embodiments will be mainly described, while the same or corresponding portions are given the same reference numerals and the explanation will be omitted. FIG. 9 is a flowchart illustrating a control operation of the controller 101 of the heating and hot water supply system 1 according to this embodiment 3.

FIG. 9 illustrates a control operation when the medium-temperature heat accumulating operation or the high-temperature heat accumulating operation is started. The controller 101 first starts the water pump 8 and the liquid pump 43 at the same timing (Step S21). At Step S21, the controller 101 sets the operating speed (rotation speed, for example) of the water pump 8 after start of the water pump 8 to become lower than the operating speed (rotation speed, for example) of the liquid pump 43 after start of the liquid pump 43. After that, the controller 101 starts the heat pump unit 2 (Step S22). Subsequently, the controller 101 compares the temperature difference $\Delta T$ between the heat pump outlet temperature detected by the temperature sensor 201 and the heat pump inlet temperature detected by the temperature sensor 212 with the threshold value (Step S23). This threshold value is 2° C. (2K), for example. If the temperature difference $\Delta T$ has not reached the threshold value yet, the controller 101 does not proceed to normal control of the water pump 8 and the liquid pump 43 but proceeds to the normal control of the water pump 8 and the liquid pump 43 after the temperature difference $\Delta T$ reaches the threshold value (Step S24). The normal control of the water pump 8 and the liquid pump 43 is the pump control method described in embodiment 1.

According to this embodiment 3, when the heat pump unit 2 is started, since the water pump 8 and the liquid pump 43 are operating, the liquid can be reliably cooled by the liquid-water heat exchanger 5. Thus, the heat pump inlet temperature can be reliably reduced. As a result, reliability of the operation of the heat pump unit 2 can be improved. Moreover, since the operating speed after start of the water pump 8 is low, an amount of the insufficiently heated water to flow into the hot water storage tank 6 can be reduced. Particularly, after start of the high-temperature heat accumulating operation, mixing of the insufficiently heated water with the high-temperature water in the upper part of the hot water storage tank 6 can be prevented.

Instead of the determination at the aforementioned Step S23, it may be so configured that it is determined whether an elapsed time after start of the water pump 8 has reached the threshold value (1 minute, for example) and the control is proceeded to the normal control of the water pump 8 and the liquid pump 43 after the elapsed time has reached the threshold value.

In the aforementioned embodiment 1 or 2, too, the controller 101 may make setting such that the operating speed after the start of the water pump 8 becomes lower than the operating speed after start of the liquid pump 43.

Embodiment 4

Figure 10:
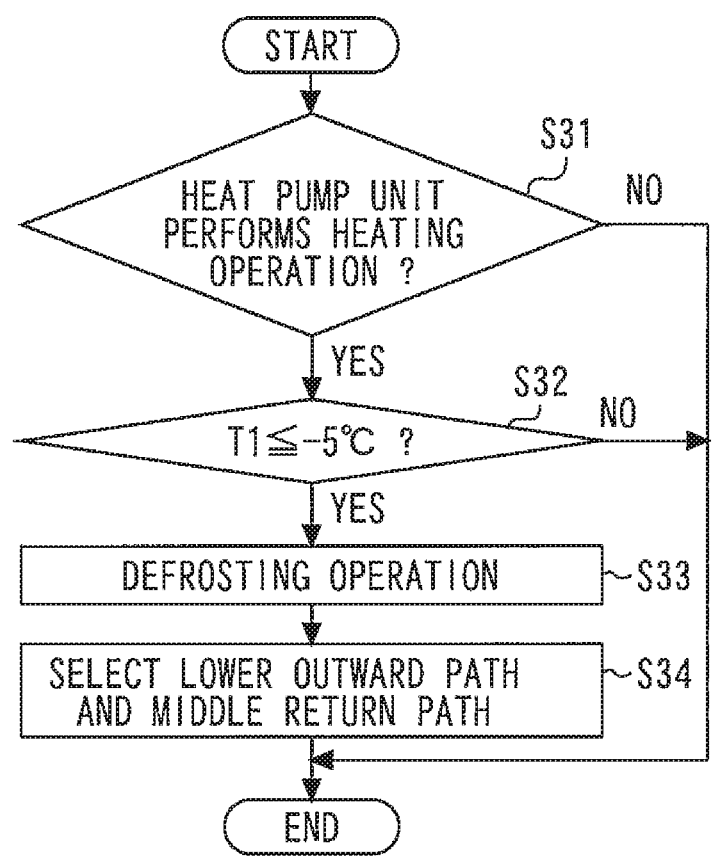
FIG. 10 is a flowchart illustrating a control operation of a controller of a heating and hot water supply system according to embodiment 4.

Subsequently, embodiment 4 of the present invention will be described by referring to FIG. 10 but differences from the aforementioned embodiments will be mainly described, while the same or corresponding portions are given the same reference numerals and the explanation will be omitted. FIG. 10 is a flowchart illustrating a control operation of the controller 101 of the heating and hot water supply system 1 according to this embodiment 4.

When the heat pump unit 2 performs the heating operation in cold outside air temperature, frost can adhere to the refrigerant-air heat exchanger 27. If a lot of frost adheres, a defrosting operation needs to be performed. FIG. 10 illustrates a control operation in the defrosting operation. The controller 101 first determines whether the heat pump unit 2 is performing the heating operation (Step S31). While the heat pump unit 2 is performing the heating operation, the controller 101 proceeds to Step S32, and if not, it finishes processing in this flowchart. At Step S32, the controller 101 compares a temperature T1 detected by the temperature sensor 208 with a threshold value (−5° C., for example). If the temperature T1 detected by the temperature sensor 208 is at the threshold value or less, the controller 101 proceeds to Step S33 and starts the defrosting operation, and if not, it finishes the processing in this flowchart.

At Step S33, the controller 101 starts the defrosting operation as follows. First, it stops the compressor 23 once and then, switches the four-way valve 24 so that the destination of the refrigerant discharged from the compressor 23 becomes the refrigerant-air heat exchanger 27. After that, the controller 101 re-starts the compressor 23. As a result, the defrosting operation is started. In the defrosting operation, the refrigerant discharged from the compressor 23 is circulated in the order of the four-way valve 24, the second refrigerant port 272, the refrigerant-air heat exchanger 27, the first refrigerant port 271, the expansion valve 26, the second refrigerant port 252, the refrigerant-liquid heat exchanger 25, the first refrigerant port 251, the four-way valve 24, the accumulator 28, and the compressor 23. The high-temperature and high-pressure refrigerant discharged from the compressor 23 flows into the refrigerant-air heat exchanger 27 and melts the frost.

In the defrosting operation, the controller 101 controls the three-way valve 7 and the three-way valve 9 so that the lower outward path and the middle return path are selected (Step S34). Since the refrigerant does not heat the liquid in the refrigerant-liquid heat exchanger 25 in the defrosting operation, a non-heated liquid flows from the heat pump unit 2 to the liquid pipe 41. Thus, the liquid does not heat the water in the liquid-water heat exchanger 5. As the aforementioned Step S34, by selecting the lower outward path and the middle return path in the defrosting operation, mixing of the insufficiently heated water with the high-temperature water in the upper part of the hot water storage tank 6 can be prevented.

The controller 101 may control the three-way valve 29 so that the room-heating circuit is selected and stop the water pump 8 instead of Step S34. By controlling the three-way valve 29 so that the room-heating circuit is selected in the defrosting operation and by stopping the water pump 8, mixing of the insufficiently heated water with the high-temperature water in the upper part of the hot water storage tank 6 can be prevented.

As defrosting progresses, the temperature T1 detected by the temperature sensor 208 rises. The controller 101 may finish the defrosting operation when the temperature T1 detected by the temperature sensor 208 reaches a second threshold value (10° C., for example). If the defrosting operation is to be finished, the controller 101 stops the compressor 23 once and switches the four-way valve 24 and then, re-starts the compressor 23 so as to resume the heating operation of the heat pump unit 2 and recovers the control operation of the hot water storage unit 3 to the original operation.

Embodiment 5

Figure 11:
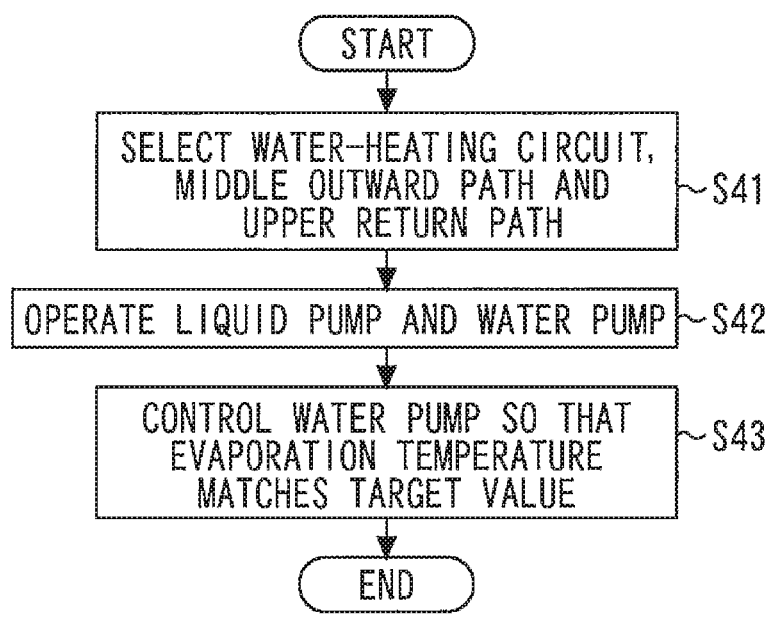
FIG. 11 is a flowchart illustrating a control operation of a controller of a heating and hot water supply system according to embodiment 5.

Subsequently, embodiment 5 of the present invention will be described by referring to FIG. 11 but differences from the aforementioned embodiments will be mainly described, while the same or corresponding portions are given the same reference numerals and the explanation will be omitted. FIG. 11 is a flowchart illustrating a control operation of the controller 101 of the heating and hot water supply system 1 according to this embodiment 5.

FIG. 11 illustrates a control operation in a defrosting operation. In the defrosting operation, the controller 101 controls the three-way valve 29, the three-way valve 7, and the three-way valve 9 so that the water-heating circuit, the middle outward path, and the upper return path are selected (Step S41). Then, the controller 101 operates the liquid pump 43 and the water pump 8 (Step S42). The operating speed of the liquid pump 43 may be constant or particularly may be fixed to the maximum speed.

By controlling as above, the medium-temperature water in the hot water storage tank 6 is circulated to the liquid-water heat exchanger 5, and the medium-temperature water heats the liquid in the liquid-water heat exchanger 5. The heated liquid is circulated to the refrigerant-liquid heat exchanger 25, and the liquid heats the refrigerant in the refrigerant-liquid heat exchanger 25. As a result, the frost can be melted earlier, and time for the defrosting operation can be reduced. The defrosting operation has lower efficiency and larger electricity consumption as compared with the medium-temperature heat accumulating operation. In this embodiment 5, the medium-temperature water is consumed in the defrosting operation, but since time for the defrosting operation with low efficiency is reduced, the electricity consumption can be reduced as a whole.

In the defrosting operation in this embodiment 5, the higher the operating speed of the water pump 8 is, the larger a heat exchange amount of the liquid-water heat exchanger 5 and the heat exchange amount of the refrigerant-liquid heat exchanger 25 become, and a heat accumulation amount of the hot water storage tank 6 lowers. The larger the heat exchange amount of the refrigerant-liquid heat exchanger 25 becomes, the higher the pressure of the refrigerant suctioned into the compressor 23 or an evaporation temperature of the refrigerant rises. The evaporation temperature of the refrigerant in the defrosting operation can be detected by the temperature sensor 207. In this embodiment 5, in the defrosting operation, the operating speed of the water pump 8 may be controlled so that the evaporation temperature of the refrigerant matches a target value (5° C., for example) (Step S43). By constituting as above, regardless of the outside air temperature, the water temperature distribution in the hot water storage tank 6 or the like, an appropriate heat amount can be given from the hot water storage tank 6 to the refrigerant-liquid heat exchanger 25. The target value of the evaporation temperature is preferably 0° C. or above in order to avoid freezing of the water.

Instead of the aforementioned Step S43, a sensor for detecting a pressure of the refrigerant suctioned into the compressor 23 may be provided, and the operating speed of the water pump 8 may be controlled so that the pressure of the refrigerant suctioned into the compressor 23 matches the target value. In that case, too, the same effect as above can be obtained. Instead of the temperature sensor 207, by providing a temperature sensor in any one of paths passing through the expansion valve 26, the refrigerant-liquid heat exchanger 25, the four-way valve 24, the accumulator 28, and the compressor 23, the evaporation temperature of the refrigerant or the pressure of the refrigerant suctioned into the compressor 23 may be calculated on the basis of a temperature detected by the temperature sensor.

REFERENCE SIGNS LIST 1 heating and hot water supply system
2 heat pump unit
3 hot water storage unit
4 room heater
5 liquid-water heat exchanger
6 hot water storage tank
7 three-way valve
8 water pump
9 three-way valve
10, 11 waterpipe
12 feed-water pipe
13 middle hot water supply pipe
14 three-way valve
15 hot water supply pipe
16 mixing valve
17 feed-water pipe
18 hot water supply pipe
19 upper hot water supply pipe
20, 21 water pipe
22a, 22b, 22c valve 23 compressor
24 four-way valve
25 refrigerant-liquid heat exchanger
26 expansion valve
27 refrigerant-air heat exchanger
28 accumulator
29 three-way valve
30, 31 liquid pipe
32 water pipe
33 liquid pipe
34, 35 water pipe
40, 41, 42 liquid pipe
43 liquid pump
44 liquid pipe
51, 52 connection portion
53 connection port
54, 55, 56 connection portion
57, 58, 59, 60, 61 connection port
101 controller
102 room-heating-remote controller
103 hot-water-supply-remote controller
104 measuring unit
105 calculation unit
106 control unit
107 communication unit
108 storage unit
109, 111 operation unit
110, 112 display unit
201, 202, 203, 204, 206, 207, 208, 209, 211, 212 temperature sensor
205 pressure sensor
251 first refrigerant port
252 second refrigerant port
271 first refrigerant port
272 second refrigerant port
901 bathroom shower
902 dishwasher
903 kitchen faucet

The invention claimed is:

1. A hot water supply system comprising: a hot water storage tank; a liquid heater configured to heat a liquid; a liquid-water heat exchanger configured to exchange heat between the liquid and water; a liquid pump configured to pump the liquid; a water pump configured to pump the water; a water-heating circuit configured to circulate the liquid between the liquid heater and the liquid-water heat exchanger; a lower outward path configured to lead the water from a lower part of the hot water storage tank to the liquid-water heat exchanger; an upper return path configured to lead the water from the liquid-water heat exchanger to an upper part of the hot water storage tank; a middle outward path configured to lead the water from a middle part of the hot water storage tank to the liquid-water heat exchanger via a connection port, the middle part being above the lower part and below the upper part; a middle return path configured to lead the water from the liquid-water heat exchanger to the middle part of the hot water storage tank via the connection port; a room heater; and a controller configured to control a medium-temperature heat accumulating operation configured to accumulate heat in the hot water storage tank by circulating the liquid of the water-heating circuit and making the water flow through the lower outward path and the middle return path; and a high-temperature heat accumulating operation configured to accumulate heat in the hot water storage tank by making the water flow through the middle outward path and the upper return path of the water heating circuit, wherein the medium-temperature heat accumulating operation is of a circulation heating type in which the water in the hot water storage tank is circulated a plurality of times to the liquid-water heat exchanger, the high-temperature heat accumulating operation is a once-through heating type in which the water in the hot water storage tank passes through the liquid-water heat exchanger only once, the medium temperature heat accumulating operation increases a volume of medium temperature water at the lower part of the hot water storage tank by heating water from the lower part of the tank and delivering the heated water to the middle part of the hot water storage tank, the high-temperature heat accumulating operation increases a volume of high-temperature water at the upper part of the hot water storage tank by heating water from the middle part of the hot water storage tank and delivering the heated water to the upper part of the hot water storage tank; and the medium temperature heat accumulating operation is an operation that does not supply heat to the room heater.

2. The hot water supply system according to claim 1, further comprising a middle hot water supply pipe connected to the middle part of the hot water storage tank, wherein a position where the middle hot water supply pipe and the hot water storage tank are connected is located above a position where the middle return path and the hot water storage tank are connected.

3. The hot water supply system according to claim 1, further comprising:
a detector configured to detect an upper-water temperature which is a water temperature of the upper part of the hot water storage tank; and
a detector configured to detect a middle-water temperature which is a water temperature of the middle part of the hot water storage tank,
wherein the controller is configured to:
select the high-temperature heat accumulating operation when the upper-water temperature is lower than a first set temperature; and
select the medium-temperature heat accumulating operation when the middle-water temperature is lower than a second set temperature lower than the first set temperature.

4. The hot water supply system according to claim 3, wherein the controller is configured to:
store hot water supply set temperatures of a plurality of hot water supply ends; and
determine the first set temperature based on a highest temperature in the hot water supply set temperature.

5. The hot water supply system according to claim 1, further comprising a detector configured to detect an upper-return-water temperature, which is a water temperature of the upper return path, wherein the controller is configured to:
control an operating speed of the water pump so that the upper-return-water temperature becomes a set temperature or above in the high-temperature heat accumulating operation; and
make the operating speed of the water pump constant in the medium-temperature heat accumulating operation.

6. The hot water supply system according to claim 1, further comprising:
a room heater configured to heat a room using heat of the liquid;
a room-heating circuit configured to circulate the liquid between the liquid heater and the room heater; and
a first valve configured to switch between the water-heating circuit and the room-heating circuit, wherein the controller is configured to control a room-heating operation configured to heat the room by circulating the liquid of the room-heating circuit; and control performed by the controller to the liquid heater in the medium-temperature heat accumulating operation, control performed by the controller to the liquid heater in the high-temperature heat accumulating operation, and control performed by the controller to the liquid heater in the room-heating operation are the same.

7. The hot water supply system according to claim 1, wherein, when the liquid heater, the liquid pump, and the water pump are started, the controller is configured to start the liquid pump before starting the liquid heater and is configured to start the water pump after starting the liquid heater.

8. The hot water supply system according to claim 1, further comprising a detector configured to detect a temperature difference between the liquid flowing out of the liquid heater and the liquid flowing into the liquid heater, wherein the controller is configured to start the water pump after the temperature difference reaches a threshold value.

9. The hot water supply system according to claim 1, wherein after the liquid pump and the water pump are started, the controller is configured to set an operating speed of the water pump lower than an operating speed of the liquid pump.

10. The hot water supply system according to claim 1, wherein the liquid heater comprises a refrigerant circuit including a compressor configured to compress refrigerant, a refrigerant-liquid heat exchanger configured to exchange heat between the refrigerant and the liquid, a refrigerant-air heat exchanger configured to exchange heat between the refrigerant and air, and a switching valve configured to switch a destination of the refrigerant discharged from the compressor between the refrigerant-liquid heat exchanger and the refrigerant-air heat exchanger, and the hot water supply system further comprises:

a second valve configured to switch between the lower outward path and the middle outward path;

a third valve configured to switch between the upper return path and the middle return path; and a controller configured to control the second valve and the third valve so that the lower outward path and the middle return path are selected in a defrosting operation in which the destination of the refrigerant discharged from the compressor is the refrigerant-air heat exchanger.

11. The hot water supply system according to claim 1, wherein the liquid heater comprises a refrigerant circuit including a compressor configured to compress refrigerant, a refrigerant-liquid heat exchanger configured to exchange heat between the refrigerant and the liquid, a refrigerant-air heat exchanger configured to exchange heat between the refrigerant and air, and a switching valve configured to switch a destination of the refrigerant discharged from the compressor between the refrigerant-liquid heat exchanger and the refrigerant-air heat exchanger, the hot water supply system further comprises:

a room heater configured to heat a room using heat of the liquid;

a room-heating circuit configured to circulate the liquid between the liquid heater and the room heater;

a first valve configured to switch between the water-heating circuit and the room-heating circuit; and a controller configured to control the first valve so that the room-heating circuit is selected in a defrosting operation in which the destination of the refrigerant discharged from the compressor is the refrigerant-air heat exchanger.

12. The hot water supply system according to claim 1, wherein the liquid heater comprises a refrigerant circuit including a compressor configured to compress refrigerant, a refrigerant-liquid heat exchanger configured to exchange heat between the refrigerant and the liquid, a refrigerant-air heat exchanger configured to exchange heat between the refrigerant and air, and a switching valve configured to switch a destination of the refrigerant discharged from the compressor between the refrigerant-liquid heat exchanger and the refrigerant-air heat exchanger, and the hot water supply system further comprises a controller configured to circulate the water by the water pump between the hot water storage tank and the liquid-water heat exchanger and circulate the liquid by the liquid pump between the liquid-water heat exchanger and the refrigerant-liquid heat exchanger, in a defrosting operation in which the destination of the refrigerant discharged from the compressor is the refrigerant-air heat exchanger.

13. The hot water supply system according to claim 12, further comprising a detector configured to detect an evaporation temperature of the refrigerant in the defrosting operation or a pressure of the refrigerant suctioned into the compressor in the defrosting operation, wherein the controller is configured to control an operation of the water pump so that the temperature or the pressure detected by the detector in the defrosting operation matches a target value.

* * * * *